(12) United States Patent
Agami et al.

(10) Patent No.: US 7,068,701 B2
(45) Date of Patent: Jun. 27, 2006

(54) DATA TRANSMISSION AND RECEPTION WITHIN A SPREAD-SPECTRUM COMMUNICATION SYSTEM

(75) Inventors: Gregory Agami, Arlington Heights, IL (US); Robert J Corke, Glen Ellyn, IL (US); Daniel G Prysby, Elk Grove Village, IL (US); Stefan Paun, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 747 days.

(21) Appl. No.: 09/867,236

(22) Filed: May 29, 2001

(65) Prior Publication Data

US 2002/0159501 A1 Oct. 31, 2002

Related U.S. Application Data

(60) Provisional application No. 60/283,984, filed on Apr. 16, 2001.

(51) Int. Cl.
*H04B 1/69* (2006.01)
*H04K 1/00* (2006.01)

(52) U.S. Cl. ........................ 375/130; 380/271
(58) Field of Classification Search ................ 375/130; 370/342, 348; 380/271
See application file for complete search history.

(56) References Cited

U.S. PATENT DOCUMENTS

| 6,188,767 | B1* | 2/2001 | Needham et al. ............ 380/271 |
| 6,334,197 | B1* | 12/2001 | Eroz et al. ................... 714/701 |
| 6,347,385 | B1* | 2/2002 | Cui et al. .................... 714/701 |
| 6,359,000 | B1* | 3/2002 | Jiang et al. ................. 370/342 |
| 6,389,000 | B1* | 5/2002 | Jou ............................. 370/342 |
| 6,389,138 | B1* | 5/2002 | Li et al. ........................ 380/35 |
| 6,427,214 | B1* | 7/2002 | Li et al. ..................... 714/701 |

* cited by examiner

*Primary Examiner*—Khai Tran
*Assistant Examiner*—Cicely Ware
(74) *Attorney, Agent, or Firm*—Kenneth A. Haas; Jeffrey K. Jacobs

(57) ABSTRACT

A long code scrambler has been provided to scramble the data bits prior to QAM mapping. Different data rates are accommodated by using different long code m-tuples sampled at the modulation symbol rate, where m equals 2, 4 or 6 for 4, 16 or 64 QAM, respectively. In order to support 1XEV-DV users employing multiple Walsh code channels, a long code 6-tuple sample is permutated, to further randomize the QAM symbols. As appropriate for the modulation order, 2, 4 or 6 bits of the permutated 6-tuple are applied to the data sequence. That is, in addition to randomizing the modulation symbols for a given code channel, each code channel will likely have unique QAM symbols at any given symbol time.

13 Claims, 5 Drawing Sheets

FIG.1 —PRIOR ART—

DATA TRANSMISSION AND RECEPTION WITHIN A SPREAD-SPECTRUM COMMUNICATION SYSTEM

FIELD OF THE INVENTION

The present invention relates generally to communication systems and in particular, to data transmission within a spread-spectrum communication system.

BACKGROUND OF THE INVENTION

In order to prevent data dependent average signal power, quadrature amplitude modulation (QAM) requires scrambling of the data bits to produce a uniformly distributed signal set. More particularly, by constantly sending the same constellation point during QAM modulation, an accurate representation of the average transmit power for the constellation cannot be obtained. This results in an inability to accurately determine the constellation point. For example, without data scrambling, a frame consisting of all 0's will result in the same transmitted QAM symbol. Such data dependent average signal power adversely affects signal peak-to-average power, which in turn degrades receiver AGC performance. This effect is especially pronounced for a single user occupying multiple Walsh code channels in the 1X evolution (EV), data and voice (DV) system.

A prior-art 1XEV-DV system 100 is shown in FIG. 1. As is evident, long-code scrambling takes place after QAM modulation. As such, long code scrambler 103 scrambles modulation symbols 102 with the long code samples at the modulation symbol rate. This results in symbol phase rotation only. As a result, when the data is constant (i.e. all 0's) the transmitted QAM symbols will all have the same energy (radius). Therefore, a need exists for a method and apparatus for data transmission that mitigates the constant transmission of a same radius during QAM modulation.

DETAILED DESCRIPTION OF THE DRAWINGS

To address the above-mentioned need, a long code scrambler has been provided to scramble the data bits prior to QAM mapping. Different data rates are accommodated by using different long code m-tuples sampled at the modulation symbol rate, where m equals 2, 3, 4 or 6 for QPSK, 8-PSK, 16-QAM, or 64-QAM, respectively. In order to support 1XEV-DV users employing multiple Walsh code channels, a long code 6-tuple sample is permutated to further randomize the QAM symbols. As appropriate for the modulation order, 2, 3, 4 or 6 bits of the permutated 6-tuple are applied to the data sequence. That is, in addition to randomizing the modulation symbols for a given code channel, each code channel will likely have unique QAM symbols at any given symbol time.

By long-code scrambling prior to QAM modulation, even when the data is constant (i.e. all 0's) the transmitted QAM symbols will not all have the same energy (radius). More particularly, each data m-tuple is bit-wise scrambled with a uniformally distributed m-tuple derived from the long code sequence. Hence, the subsequent m-tuple to QAM symbol mapping results in a uniform distribution of modulation symbols.

The present invention encompasses an apparatus for data transmission within a spread-spectrum communication system. The apparatus comprises a long-code scrambler having data symbols as an input and outputting the data symbols scrambled with a long code, and a modulator having the scrambled data symbols as an input and outputting modulated scrambled data symbols.

The present invention additionally encompasses an apparatus for reception of transmitted signals within a spread-spectrum communication system. The apparatus comprises a demodulator having a transmitted signal as an input and outputting a demodulated signal, and a long-code despreader having the demodulated signal as an input and outputting despread data.

The present invention additionally encompasses a method for data transmission. The method comprises the steps of receiving symbols by a long-code scrambler, long-code scrambling the received symbols to produced scrambled symbols, and modulating the scrambled symbols.

The present invention additionally encompasses a method for data reception. The method comprises the steps of receiving a transmitted signal and demodulating the transmitted signal to produce a demodulated signal, and long-code descrambling the demodulated signal.

The present invention additionally encompasses an apparatus comprising a long code generator outputting a long code, a decimator having the long code as an input and outputting a decimated long code, and a permuter having the decimated long code as an input and outputting a plurality of permuted, decimated long codes.

Figure 1:
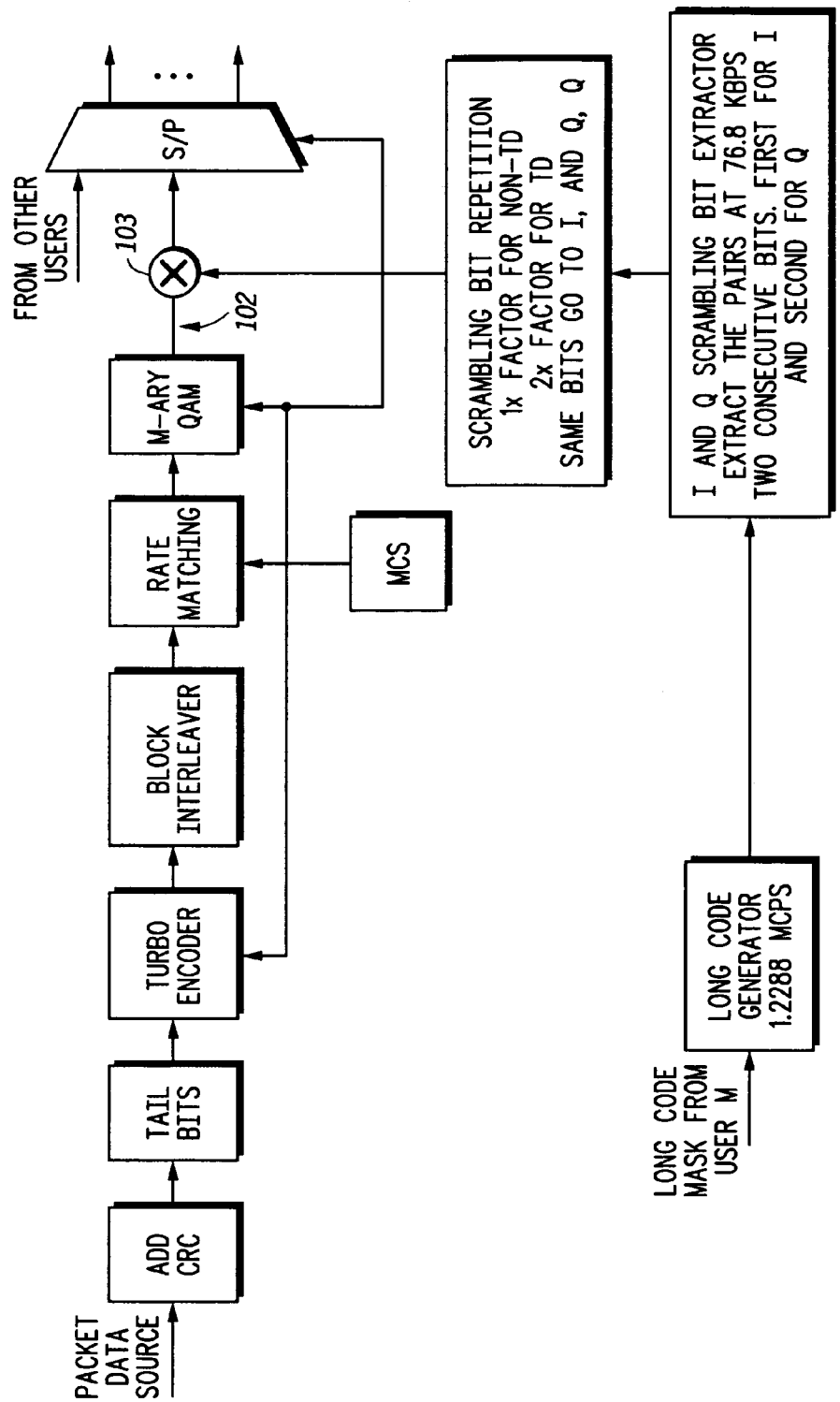
FIG. 1 is a block diagram of a prior-art 1XEV-DV transmitter.
Figure 2:
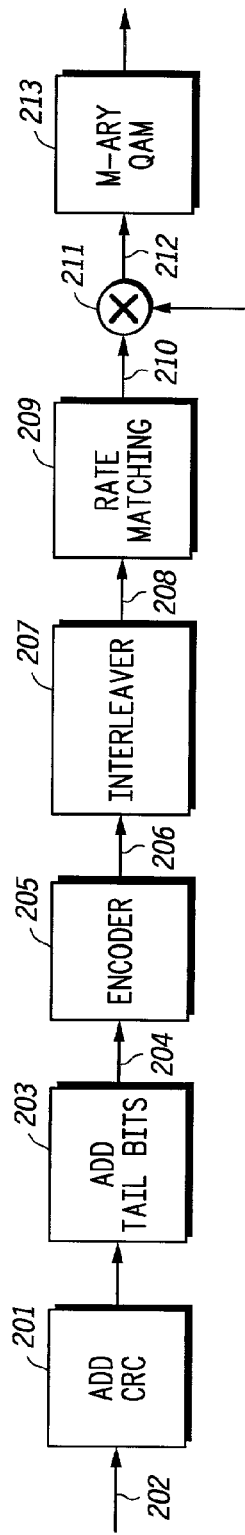
FIG. 2 is a block diagram of a transmitter in accordance with the preferred embodiment of the present invention.

Turning now to the drawings, wherein like numerals designate like components, FIG. 2 is a block diagram of transmitter 200 in accordance with the preferred embodiment of the present invention. As shown, transmitter 200 comprises CRC bit generator 201, tail-bit generator 203, encoder 205, interleaver 207, rate matcher 209, long-code scrambler 211, and QAM modulator 213. Operation of transmitter 200 in accordance with the preferred embodiment of the present invention occurs as follows: Signal 202 (data) is received by CRC-bit generator 201 at a particular bit rate. Generator 201 adds appropriate tail bits to data 202 and outputs the data stream to tail-bit generator 203. Tail-bit generator 203 receives the data stream and inserts appropriate tail bits to the data stream, and outputs the data stream to encoder 205. In the preferred embodiment of the present invention encoder 205 is a standard Turbo Encoder as described in the Cellular System Remote unit-Base Station Compatibility Standard of the Electronic Industry Association/Telecommunications Industry Association Interim Standard 2000 (IS2000-1xstandard).

Encoder 205 encodes input data bits 204 into data symbols at a fixed encoding rate with an encoding algorithm which facilitates subsequent maximum a-posteriori probability (MAP) decoding of the data symbols into data bits. For example, encoder 205 encodes input data bits 204 (received at a particular bit rate) at a fixed encoding rate of one data bit to two data symbols (i.e., rate ½) such that encoder 205 outputs two data symbols for every data bit input.

Data symbols 206 are then input into interleaver 207. Interleaver 207 interleaves the input data symbols 206 at the symbol level. In interleaver 207, data symbols 206 are individually input into a matrix which defines a predetermined size block of data symbols 206. Data symbols 206 are input into sequential locations within a matrix. Data symbols 208 are individually output from locations within the matrix so that the matrix is emptied in a predetermined permutated order. Interleaved data symbols 208 are output by interleaver 207 at the same data symbol rate that they were input. The predetermined size of the block of data symbols defined by the matrix is derived from the maximum number of data symbols which can be transmitted at a predetermined symbol rate within a predetermined length transmission block.

Interleaved data symbols 208 are repeated or punctured by rate matching circuitry 209 such that rate-matching circuitry 209 outputs data symbols at a constant symbol rate. In the preferred embodiment of the present invention, circuitry 209 outputs data symbols at 76.8*N*m kbps where N=1, 2, 3, . . . , etc., and m=2, 3, 4, 6 is the number of data symbols per modulation symbol. In particular, N is a number of channels that the data transmission is to occupy during over-the-air transmission (N≦14 for 1XEV-DV). Each of the N channels is capable of transmitting at a modulation symbol rate of 76.8 ksymbols/second, and therefore, data symbol rates of 76.8*N*m kbps are attainable when N channels are concurrently transmitting data at m data symbol per modulation symbol.

For 1XEV-DV, symbols 210 are output from circuitry 209 at 76.8*N*m kbps and received by long-code scrambler 211. For every modulation symbol period (1/76.8 kHz), 6 long code chips (generated at the chip rate) are sampled and stored in a shift register. Subsequently, the data m-tuple (m=2, 3, 4, 6) for each of the N channels is bit-wise modulated by the long code m-tuple and its permutations, C(i), selected from the sampled 6-tuple, where C(i), i=2, 3, . N, is derived from a permutation of the long code 6-tuple. For 1XEV-DV, the modulation symbol rate is 76.8 kbps. This requires a new QAM symbol for each code channel every 16 chips (1.2288 Mcps/76.8 ksps). Since 6 chips are required to sample a long code 6-tuple, scrambling and mapping must occur in 10 chip times. For worst case analysis, assume 6 bits per modulation symbol, 14 code channels with each 6-tuple scrambled and mapped serially. This requires the processing of 14×6=84 bits in 10 chip times or 8.4 bits/chip. This is easily achievable with a 16×chip frequency clock.

After long-code scrambling, scrambled symbols 212 are output to QAM modulator 213 at 76.8*N*m kbps. For 1XEV-DV, M-ary QAM modulation is performed utilizing a square, Karnaugh mapped signal set. Each scrambled m-tuple is mapped to a $2^m$-ary QAM symbol via a table look-up.

As discussed above, by long-code scrambling prior to QAM modulation, even when the data is constant (i.e. all 0's) the transmitted QAM symbols will not all have the same energy (radius). More particularly, each data m-tuple is bit-wise scrambled with a uniformally distributed m-tuple derived from the long code sequence. Hence, the subsequent m-tuple to QAM symbol mapping results in a uniform distribution of modulation symbols.

Figure 3:
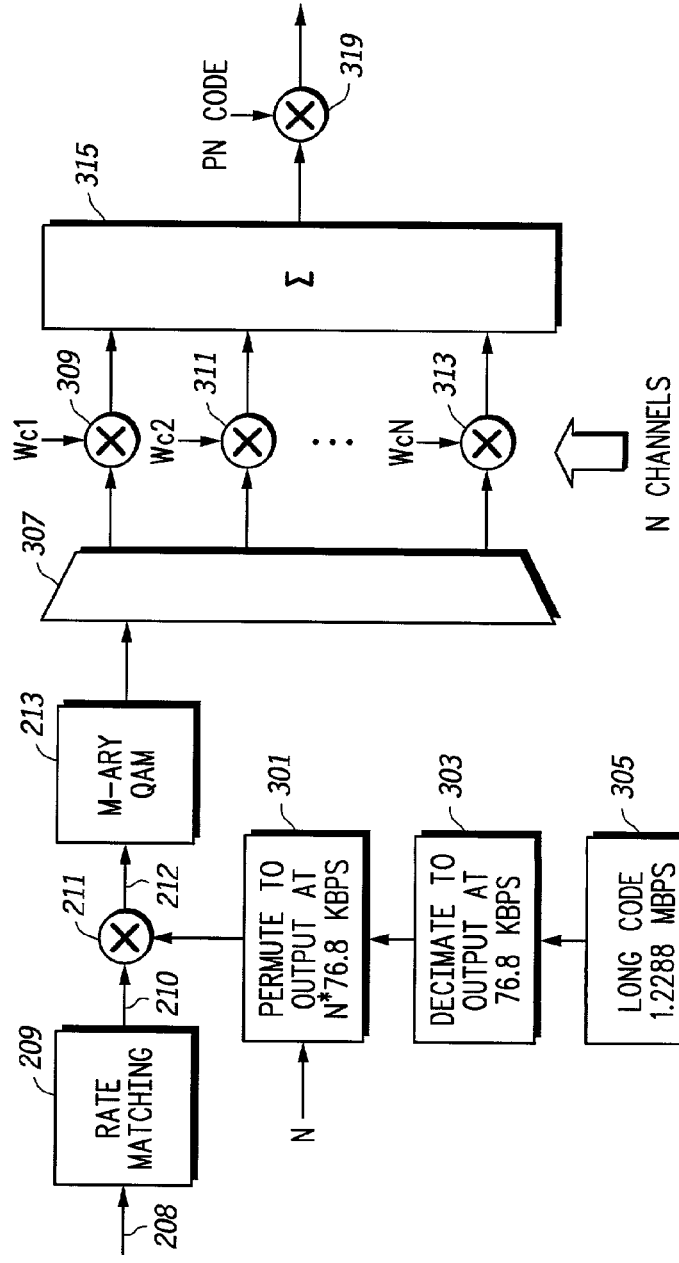
FIG. 3 is a further block diagram of the communication system of FIG. 2 in accordance with the preferred embodiment of the present invention.

FIG. 3 is a further block diagram of the communication system of FIG. 2 in accordance with the preferred embodiment of the present invention. As shown, after M-ary QAM, the modulated data stream is split into N data streams by de-multiplexer 307, each having a modulation symbol rate of 76.8 ksymbols/second. Each of the data streams is spread (via spreaders 309–313) with a spreading code that defines a particular code-division, multiple-access (CDMA) channel. In the preferred embodiment of the present invention, each spreading code comprises a 16-chip Walsh code. These orthogonal Walsh codes preferably correspond to Walsh codes from a 16 by 16 Hadamard matrix wherein a Walsh code is a single row or column of the matrix. During the spreading operation, each modulation symbol is multiplied with its 16-chip spreading code, resulting in the symbol being replaced by the scaled spreading code, or its additive inverse. The resulting data stream from each spreader 309–313 is output at 16*76.8 kcps, or 1.2288 Mcps. The channels are then summed by summer 315 further spread by a short pseudorandom code via spreader 319.

Figure 4:
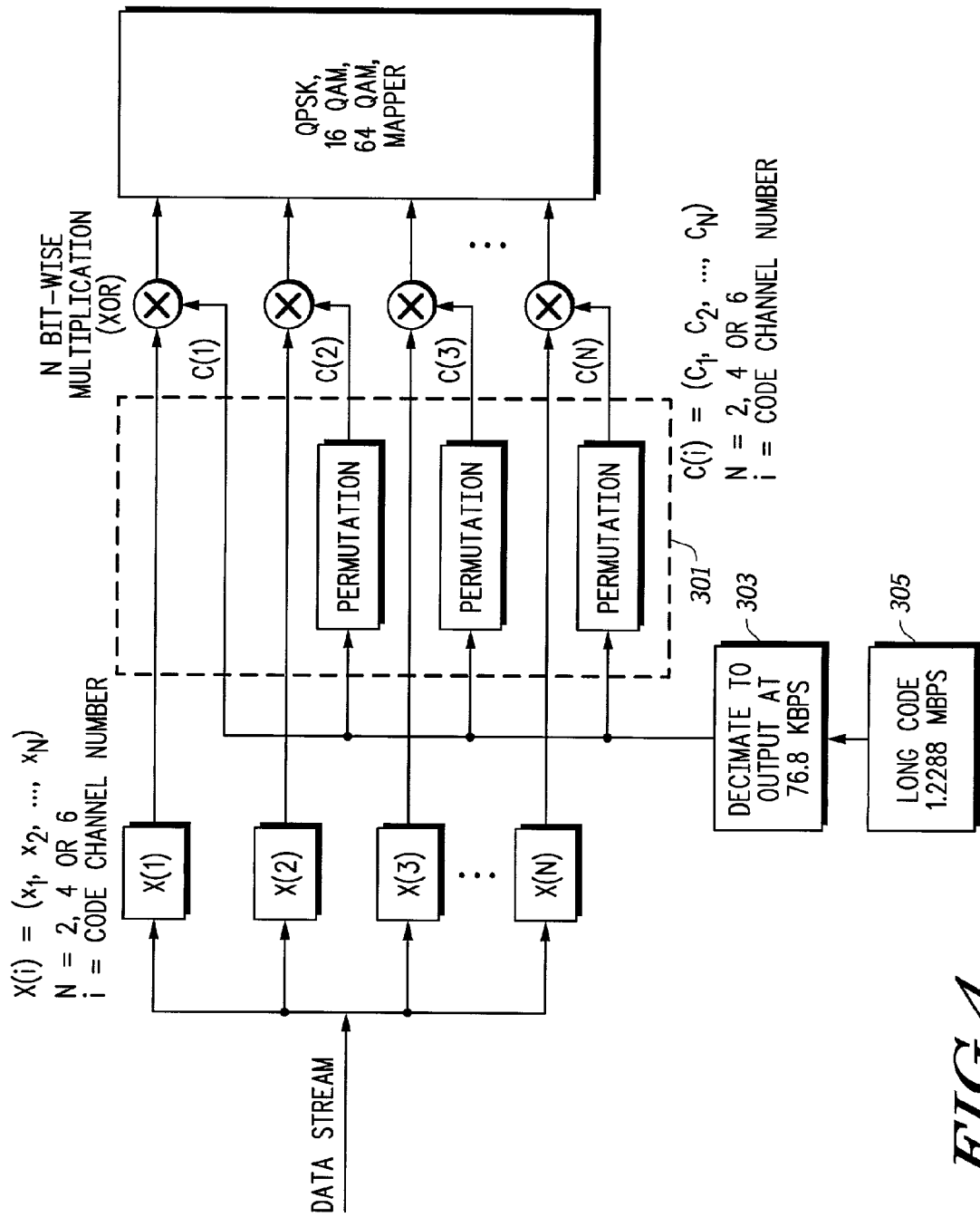
FIG. 4 is a block diagram of the long-code masker of FIG. 2 in accordance with the preferred embodiment of the present invention.

As discussed above, for every modulation symbol period (1/76.8 kHz), 6 long code chips (generated at the chip rate) are sampled and stored in a shift register. More particularly, long code generator 305 outputs the long code to decimator 303. Decimator 303 decimates the long code and outputs 6 long code chips to circuitry 301. Circuitry 301 is permuting circuitry (see FIG. 4) that permutes the 6 long code chips for each of the N channels being utilized. As discussed above, the data stream to be transmitted is transmitted over the N channels being utilized. Each channel utilizes a different permuted long code. Thus, a first long code is utilized for the first channel, the first long code is then permuted N−1 times, and these permutations in the long code are used for the remaining N−1 channels. The data m-tuple (m=2, 3, 4, 6) for each channel is bit-wise modulated by the long code m-tuple and its permutations. This is illustrated more clearly in FIG. 4.

As shown, a decimated long code (c(1)) enters permuter 301. Permuter 301 outputs the decimated long code along with N−1 permuted long codes to spreader 211 (shown as N spreaders). More particularly, each of the additional N−1 data m-tuples is scrambled with a reordered version of the sampled long code m-tuple. Each segment (X(1) through X(N)) of the data stream is bit-wise XORed by C(1) through C(N), respectively.

Figure 5:
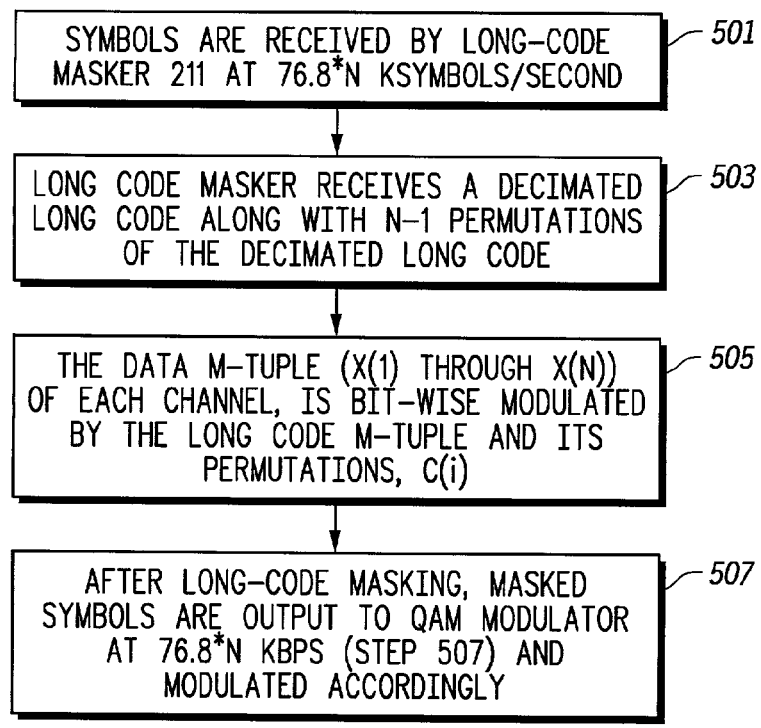
FIG. 5 is a flow chart showing operation of the transmitter of FIG. 2 in accordance with the preferred embodiment of the present invention.

FIG. 5 is a flow chart showing operation of the transmitter of FIG. 2 in accordance with the preferred embodiment of the present invention. The logic flow begins at step 501 where symbols 210 are output from circuitry 209 at 76.8*N*m kbps and received by long-code scrambler 211. Long code scrambler 211 receives a decimated long code along with N−1 permutations of the decimated long code (step 503). At step 505 the data m-tuple (X(1) through X(N)) of each channel, is bit-wise modulated by the long code m-tuple and its permutations, C(i). After long-code masking, scrambled data symbols 212 are output to QAM modulator 213 at 76.8*N*m kbps (step 507).

As discussed above, by long-code scrambling prior to QAM modulation, even when the data is constant (i.e. all 0's) the transmitted QAM symbols will not all have the same energy (radius). More particularly, each data m-tuple is bit-wise scrambled with a uniformally distributed m-tuple derived from the long code sequence. Hence, the subsequent m-tuple to QAM symbol mapping results in a uniform distribution of modulation symbols.

Figure 6:
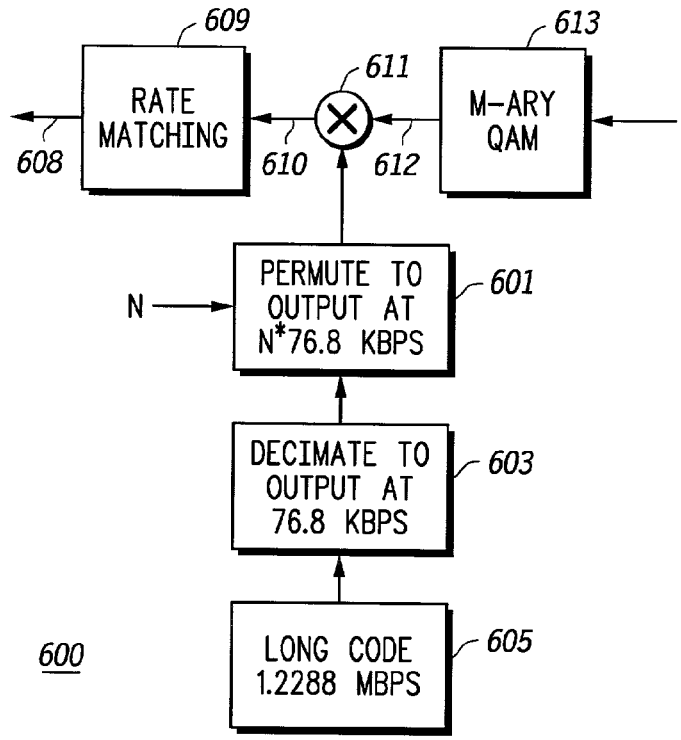
FIG. 6 is a block diagram of a receiver in accordance with the preferred embodiment of the present invention.

FIG. 6 is a block diagram of receiver 600 in accordance with the preferred embodiment of the present invention. In the preferred embodiment of the present invention the receiver 600 serves to demodulate the data transmitted by transmitter 200 over the N channels. Receiver 600 comprises QAM demodulator 613, long code descrambler 611, and rate matching circuitry 609. Operation of receiver 600 in accordance with the preferred embodiment of the present invention occurs as follows: M-ary QAM demodulator 613 demodulates the incoming symbol stream by computing the log-likelihood ratio (LLR) of each data bit. If an LLR is the LLR of the scrambled data bit, the LLR of the unscrambled data bit is (1–2c)LLR', where c=(0,1) is the LC sequence value. This is evident from the definition of the LLR.

$$LLR(u) = \log\left(\frac{P(u = 0 \mid y_k)}{P(u = 1 \mid y_k)}\right)$$

$$LLR(u') = \log\left(\frac{P(u \oplus LC = 0 \mid y_k)}{P(u \oplus LC = 1 \mid y_k)}\right)$$

$$= (1 - 2LC)LLR(u)$$

where $\oplus$ represents modulo two addition.

Figure 7:
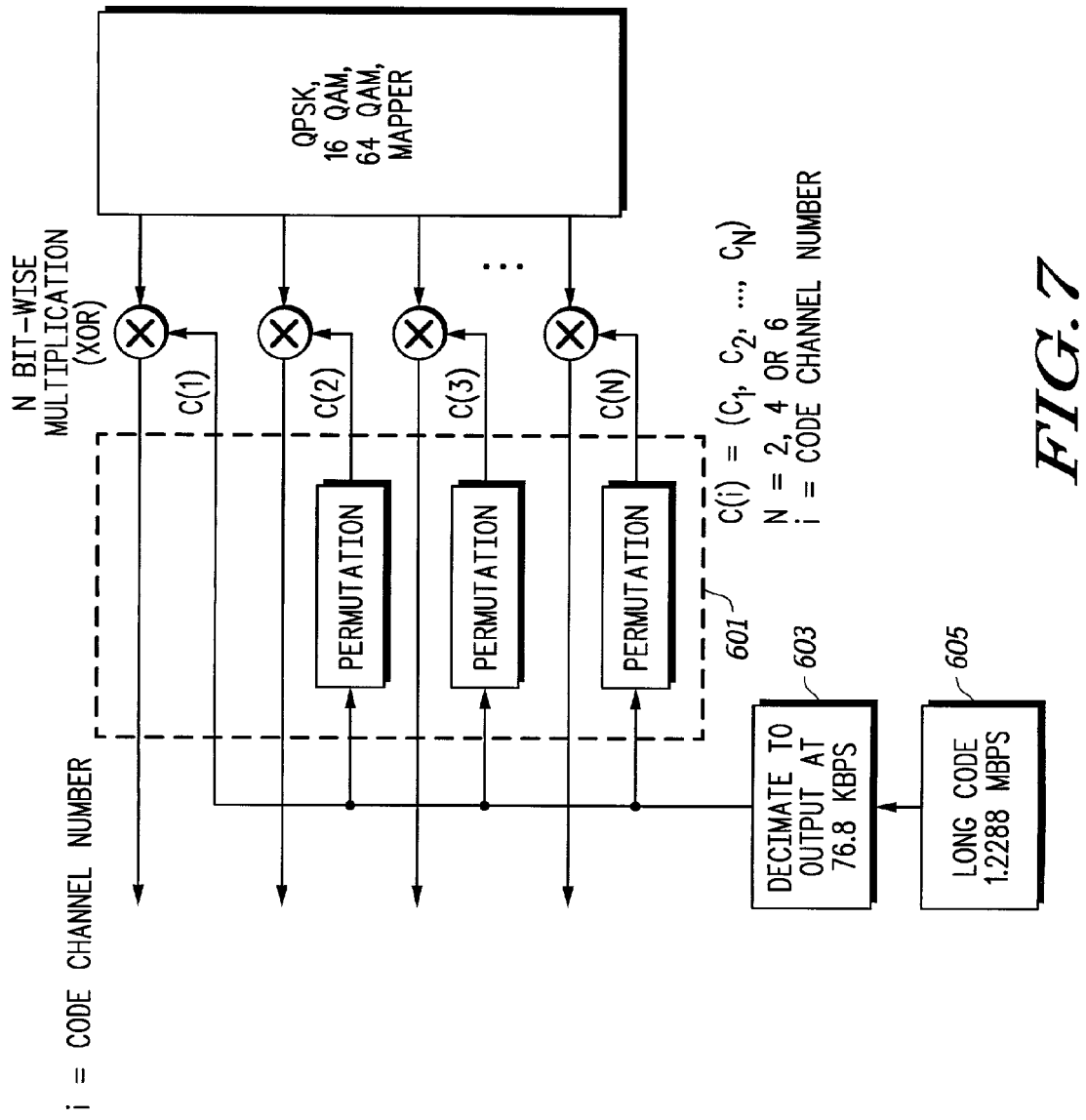
FIG. 7 is a further block diagram of a receiver in accordance with the preferred embodiment of the present invention.

After M-ary demodulation, the symbol stream enters descrambler 611. Descrambler 611 is similar to scrambler 211. As discussed above, for every modulation symbol period (1/76.8 kHz), 6 long code chips (generated at the chip rate) are sampled and stored in a shift register. More particularly, long code generator 605 outputs the long code to decimator 603. Decimator 603 decimates the long code and outputs 6 long code chips to circuitry 601. Circuitry 601 is permuting circuitry (see FIG. 7) that permutes the 6 long code chips for each of the N channels being utilized. In particular, the received data stream is received over the N channels being utilized. Each channel utilizes a different permuted long code. Thus, a first long code is utilized for the first channel, the first long code is then permuted N–1 times, and these permutations in the long code are used for the remaining N–1 channels. The data m-tuple (m=2, 3, 4, 6) for each channel is bit-wise modulated by the long code m-tuple and its permutations. This is illustrated more clearly in FIG. 7.

As shown, a decimated long code (c(1)) enters permuter 601. Permuter 601 outputs the decimated long code along with N–1 permuted long codes to spreader 611 (shown as N spreaders). More particularly, each of the additional N–1 data m-tuples is scrambled with a reordered version of the sampled long code m-tuple. Each segment (X(l) through X(N)) of the data stream is multiplied by 1–2*C(1) through 1–2*C(N), respectively.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. An apparatus for data transmission within a spread-spectrum communication system, the apparatus comprising:
    a long-code scrambler having data symbols as an input and outputting the data symbols scrambled with a long code; and
    a modulator having the scrambled data symbols as an input and outputting modulated scrambled data symbols, wherein the long-code scrambler comprises:
    a long code generator outputting a long code;
    a decimator having the long code as an input and outputting a decimated long code; and
    a permuter having the decimated long code as an input and outputting a plurality of permuted, decimated long codes each having a same length as the decimated long code.

2. An apparatus for reception of transmitted signals within a spread-spectrum communication system, the apparatus comprising:
    a demodulator having a transmitted signal as an input and outputting a demodulated signal; and
    a long-code despreader having the demodulated signal as an input and outputting despread data, wherein the long-code descrambler comprises:
    a long code generator outputting a long code;
    a decimator having the long code as an input and outputting a decimated long code; and
    a permuter having the decimated long code as an input and outputting a plurality of permuted, decimated long codes each having a same length as the decimated long code.

3. A method for data transmission, the method comprising the steps of:
    receiving symbols by a long-code scrambler;
    long-code scrambling the received symbols to produced scrambled symbols;
    modulating the scrambled symbols, wherein long-code scrambling comprises:
    generating a long code;
    generating a decimated long code using the long code; and
    permuting the decimated long code to produce a plurality of permuted decimated long codes each having a same length as the decimated lone code.

4. A method for data reception comprising the steps of:
    receiving a transmitted signal and demodulating the transmitted signal to produce a demodulated signal;
    long-code descrambling the demodulated signal, wherein long-code descrambling comprises:
    generating a long code;
    generating a decimated long code using the long code; and
    permuting the decimated long code to produce a plurality of permuted, decimated long codes each having a same length as the decimated long code.

5. An apparatus comprising:
    a long code generator outputting a long code;
    a decimator having the long code as an input and outputting a decimated long code; and
    a permuter having the decimated long code as an input and outputting a plurality of permuted, decimated long codes each having a same length as the decimated long code.

6. The apparatus of claim 5 further comprising:
    a plurality of scramblers having the plurality of permuted long codes as an input and outputting a plurality of scrambled data streams.

7. The apparatus of claim 6 further comprising:
    a plurality of quadrature amplitude modulators, each having a scrambled data stream as an input and outputting a modulated data stream.

8. The apparatus of claim 1 wherein the modulator maps the scrambled data symbols to a constellation.

9. The apparatus of claim 8 wherein the modulator is a quadrature amplitude modulator.

10. The apparatus of claim 2 wherein the demodulator is a quadrature amplitude demodulator.

11. The method of claim 3 wherein the step of modulating the scrambled symbols comprises the step of mapping the symbols to a constellation.

12. The method of claim 11 wherein the step of modulating the scrambled symbols comprises the step of quadrature amplitude modulating the scrambled symbols.

13. The method of claim 4 wherein the step of receiving and demodulating the transmitted signal comprises the step of receiving and quadrature amplitude demodulating the received signal.

* * * * *